United States Patent Office 3,334,146
Patented Aug. 1, 1967

3,334,146
METHOD FOR THE PURIFICATION OF
BIS(4-CHLOROPHENYL) SULFONE
Harold M. Pitt, Lafayette, and Harry Bender, El Cerrito, Calif., assignors to Stauffer Chemical Company, New York, N.Y., a corporation of Delaware
No Drawing. Filed Aug. 19, 1964, Ser. No. 390,734
1 Claim. (Cl. 260—607)

This invention relates to a method of obtaining pure bis(4-chlorophenyl) sulfone. More particularly, this invention pertains to a method of isolating isomerically pure crystalline bis(4-chlorophenyl) sulfone.

The subject compound finds particular utility in agricultural chemistry as a stomach poison for insects, especially for phosphate-resistant mites. Several uses are known for the compound as an intermediate in the plastics industry. The chloro-substituents can be replaced by such groups as amino, hydroxyl, or in reaction with sulfur or metal sulfides, as copper sulfide and the like, to produce sulfur-sulfone polymers. The intermediates thereby produced can be used further in forming plastic materials.

In the preparation of bis(4-chlorophenyl)sulfone, which is by the reaction of monochlorobenzene and p-chlorobenzene sulfonyl chloride using ferric chloride as a catalyst, there arises the possibility of the isomeric ortho-para' and meta-para' as well as the para-para' sulfones. In the particular utility employing the compound in the formation of polymers, wherein a linear configuration is preferred, it is objectionable to have present in the composition the ortho-para' and meta-para' isomers. The presence of these isomeric forms of bis-dichlorophenyl sulfone results in a non-uniform continuity in the desired linear polymer.

The prior art describes the use of alcohol in order to fractionally crystallize the isomeric bis-chlorophenyl sulfones. Although this method does provide separation of the isomers, it necessitates the removal of all the excess and unreacted monochlorobenzene. If the monochlorobenzene is not completely removed the use of alcohol as a solvent is restricted. Whereas, in the present invention monochlorobenzene is used as the crystallization solvent there is no need to remove the monochlorobenzene. Thus, the step of freeing the reaction product of monochlorobenzene, in order that alcohol may be used as the crystallization solvent, is eliminated.

A principal object of our invention is to provide a method whereby essentially pure isomeric bis(4-chlorophenyl) sulfone can be obtained. The material thereby obtained is substantially free from ortho-para' and meta-para' dichlorophenyl sulfones. The presence of the ortho-para' and meta-para' isomers interfere with the utility of the para-para' dichlorodiphenyl sulfone in many applications. Moreover, the invention affords development of a method for preparing bis(4-chlorophenyl) sulfone rich material by employment of the novel selective crystallization procedure of the invention.

Pursuant to the above-mentioned and yet further objectives, it has been found that bis(4-chlorophenyl) sulfone can be obtained substantially isomerically pure by the process of selective crystallization from monochlorobenzene. Upon one recrystallization from monochlorobenzene the material can be essentially free of the isomeric 2,4'- and 3,4'-dichlorodiphenyl sulfones.

The starting material for the invention consists of a mixture of 4,4'-, 2,4'- and 3,4'-dichlorophenyl sulfones. The method of obtaining the mixture of isomers is not critical. One such method as described in the prior art, U.S. 2,224,964, prepares aromatic sulfones by causing an aromatic sulfonyl chloride to condense, in the presence of a Friedel-Crafts reagent such as ferric chloride, as a catalyst with an aromatic hydrocarbon. According to the present invention the resulting isomeric mixture is then taken up in dry monochlorobenzene and washed with hot acidified water until essentially free of ferric ion. The temperature during the washing operation should be sufficiently high to prevent the formation of crystals. Upon cooling of the monochlorobenzene solution the bis(4-chlorophenyl) sulfone is the first to crystallize out. Upon recrystallization from monochlorobenzene essentially isomerically pure 4,4'-dichlorodiphenyl sulfone can be obtained. The number of recrystallizations that may be required will depend upon the original composition of the crude bis(chlorophenyl) sulfone obtained from the reaction. It is possible therefore that any ratio of 2,4', 3,4' and 4,4' be present in the crude product, and that through sufficient recrystallizations essentially isomerically pure 4,4'-dichlorodiphenyl sulfone may be obtained.

The following non-limiting example is set forth to further illustrate the present invention, the parts being by weight.

Example

To 1810 parts of 4-chlorobenzene sulfonyl chloride was added 1100 parts of dry monochlorobenzene. The reactants were placed in a suitable vessel fitted for agitation and a reflux condenser. Thirty parts of anhydrous ferric chloride was added and agitation and heating begun. The monochlorobenzene should be dry as moisture at this phase of the reaction tends to produce substances which make the subsequent washing operation difficult due to emulsion formation. Heating should be controlled so that the reflux condenser is not overloaded resulting in loss of monochlorobenzene. The temperature of the reaction flask increased steadily as the monochlorobenzene was consumed in the reaction. The reaction was complete when hydrogen chloride gas evolution was negligible or an infrared analysis showed the absence of sulfonyl chloride.

When the reaction was over, 2750 parts of monochlorobenzene were added slowly, bringing the temperature down. The resulting solution in monochlorobenzene was then washed with dilute hydrochloric acid (approx. 5%) until the iron content of the organic phase was one to two parts per million. The temperature during the washing operation should be about 70–90° C. to prevent the formation of crystals.

When the iron has been sufficiently removed, the bis(4-chlorophenyl) sulfone was crystallized with agitation and slow cooling. The crystals on removal from the mother liquor were redissolved in monochlorobenzene and recrystallized in the same way. There was obtained 2122 parts of isomerically pure bis(4-chlorophenyl) sulfone, M.P. 148.0–148.5° C. Approximately 2300–2500 parts of monochlorobenzene were required for the second crystallization depending on the amount of monochlorobenzene left in the first crop of crystals.

Various changes and modifications may be made without departing from the spirit and scope of the invention described herein as will be apparent to those skilled in the art to which it pertains. It is accordingly intended that the present invention shall only be limited by the scope of the appended claim.

We claim:

A method for the isolation of isomerically pure bis(4-chlorophenyl) sulfone from solutions containing therein dichlorophenyl sulfones of the group bis(4-chlorophenyl) sulfone, 2,4'-dichlorodiphenyl sulfone and 3,4'-dichlorodiphenyl sulfone comprising the steps: (1) dissolving a mixture containing isomers of dichlorodiphenyl sulfones comprising bis(4-chlorophenyl) sulfone, 2,4'-dichlorodiphenyl sulfone and 3,4'-dichlorodiphenyl sulfone in sufficiently hot monochlorobenzene and (2) cooling the solution to induce the formation of crystalline bis(4-chlorophenyl) sulfone.

No references cited.

CHARLES B. PARKER, *Primary Examiner.*

DELBERT R. PHILLIPS, *Assistant Examiner.*